Figure 1:
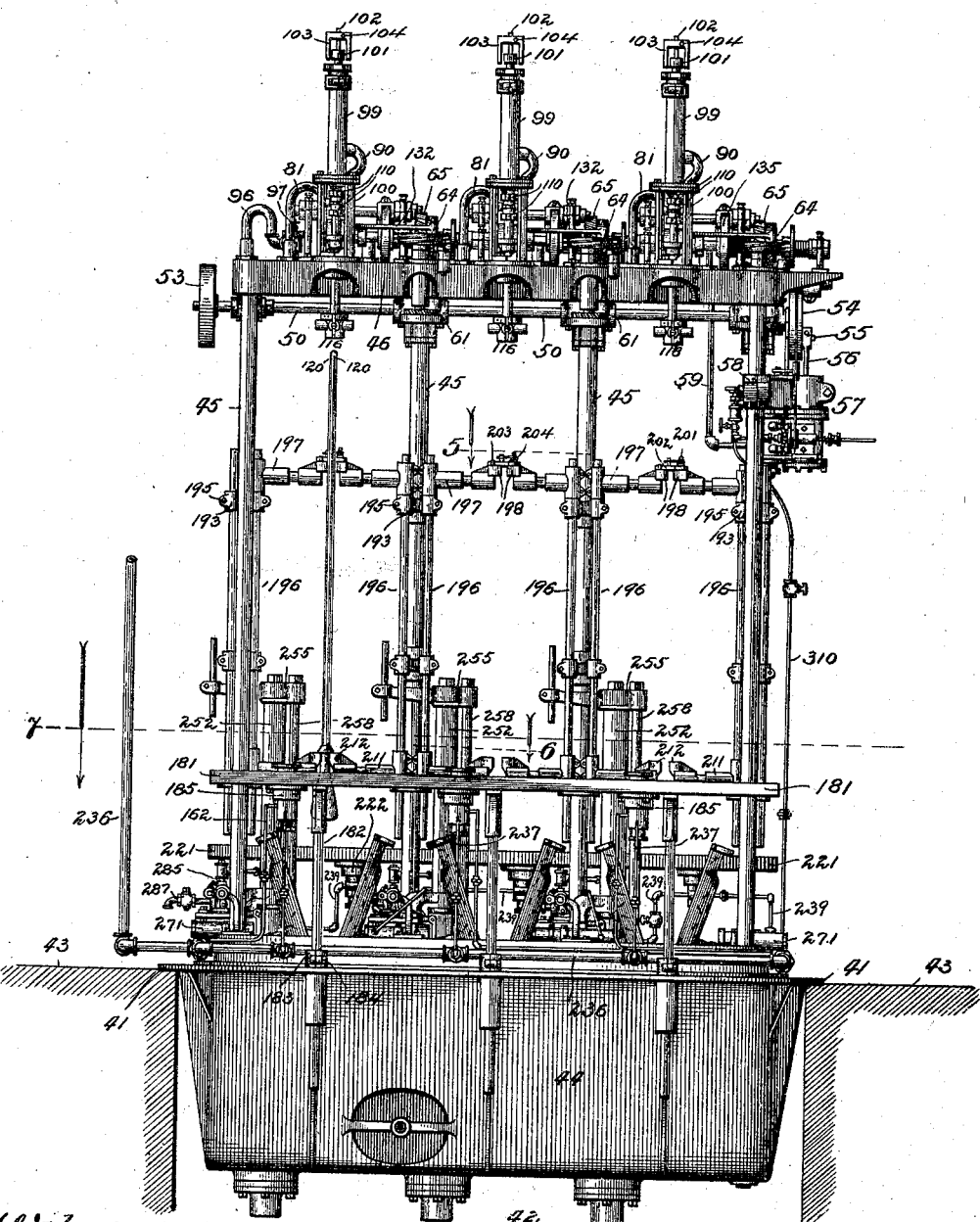

No. 671,100. Patented Apr. 2, 1901.
B. M. ASLAKSON.
GLASS BLOWING MACHINE.
(Application filed Aug. 15, 1900.)
(No Model.) 19 Sheets—Sheet 3.

Witnesses:
Inventor:
Baxter Martin Aslakson,
By Dwight B. Cheever
Att'y.

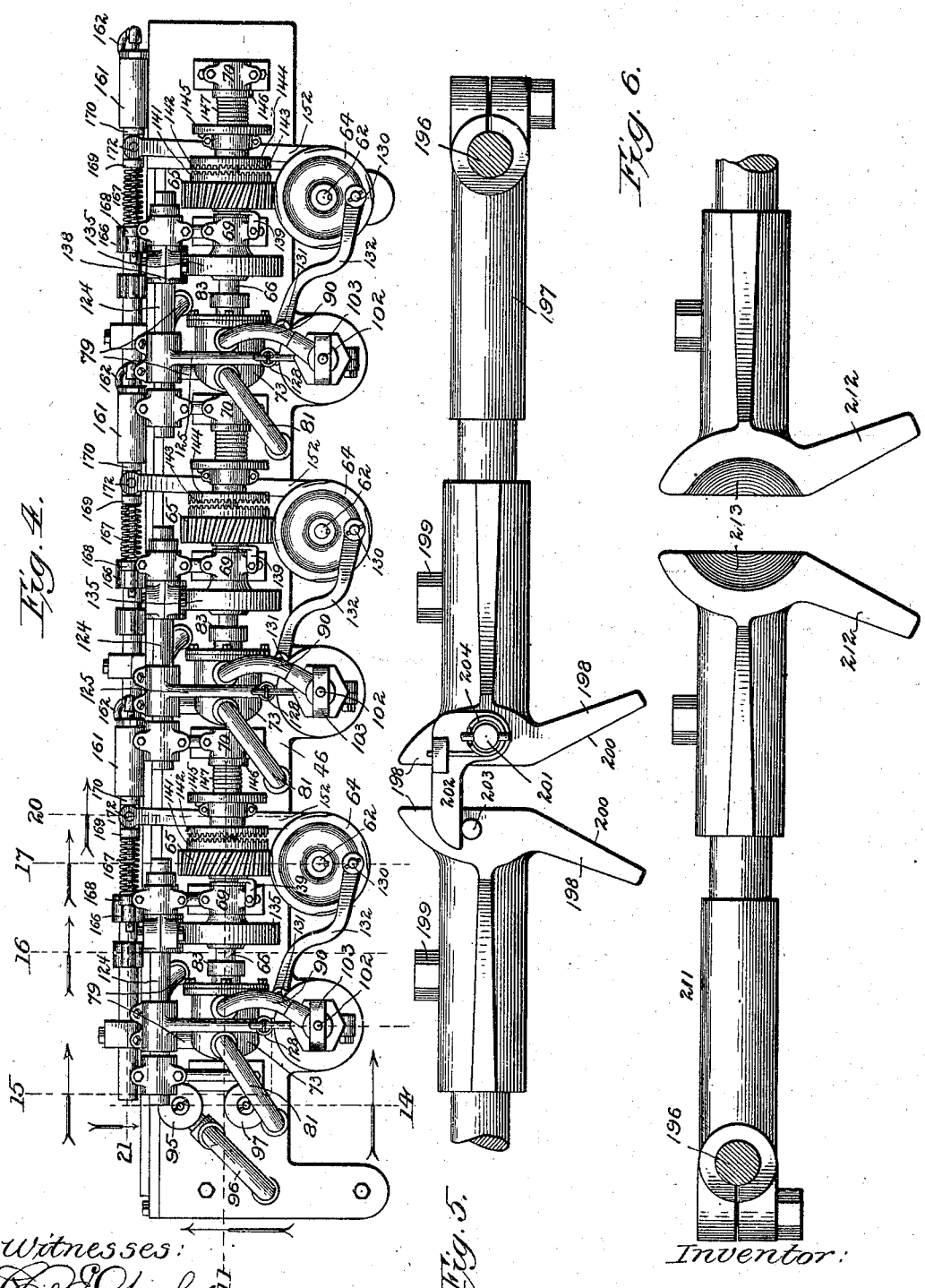

No. 671,100. Patented Apr. 2, 1901.
B. M. ASLAKSON.
GLASS BLOWING MACHINE.
(Application filed Aug. 15, 1900.)
(No Model.) 19 Sheets—Sheet 5.

Witnesses:
Inventor:
Baxter Martin Aslakson,
By Dwight B Cheever
Att'y.

No. 671,100. Patented Apr. 2, 1901.
B. M. ASLAKSON.
GLASS BLOWING MACHINE.
(Application filed Aug. 15, 1900.)
(No Model.) 19 Sheets—Sheet 6.

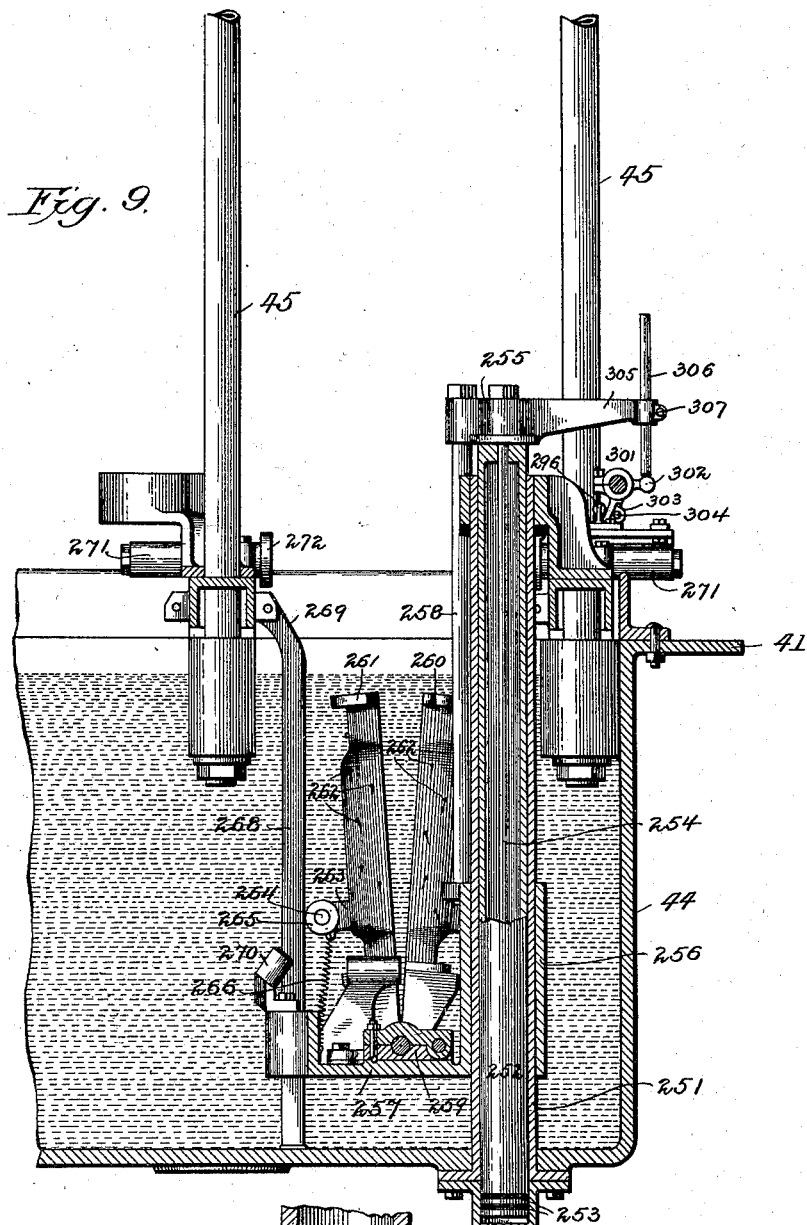

No. 671,100. Patented Apr. 2, 1901.
B. M. ASLAKSON.
GLASS BLOWING MACHINE.
(Application filed Aug. 15, 1900.)
(No Model.) 19 Sheets—Sheet 8.
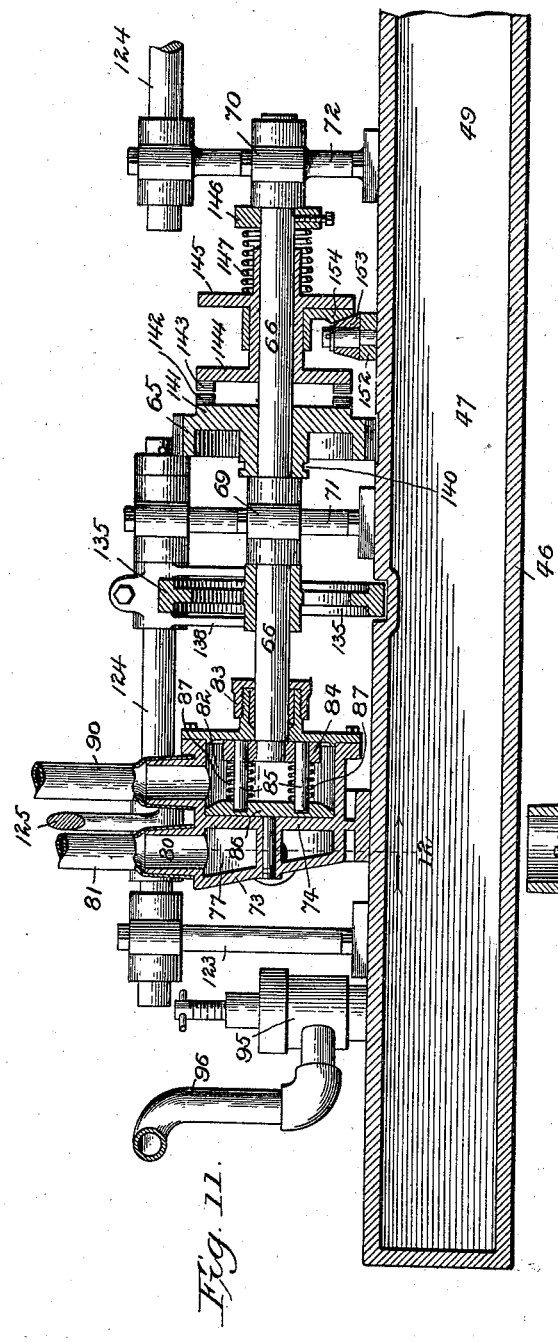
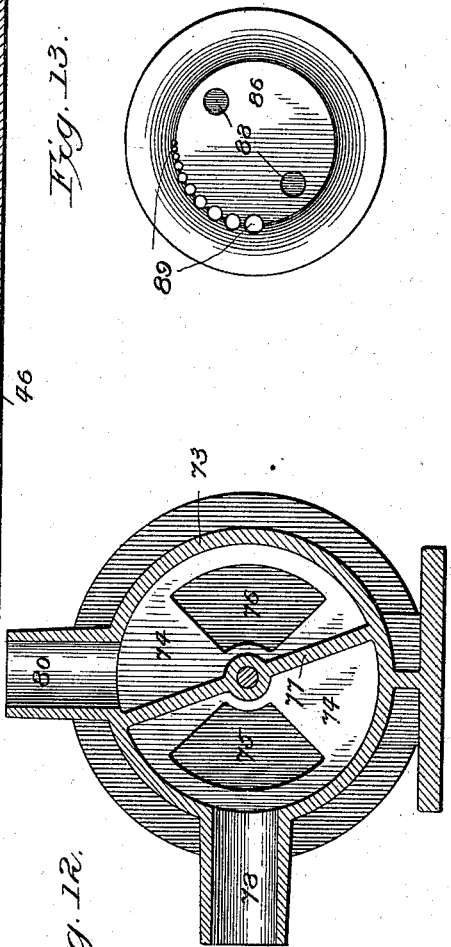
Witnesses:
Inventor:
Baxter Martin Aslakson.
By Dwight B Cheever
Att'y

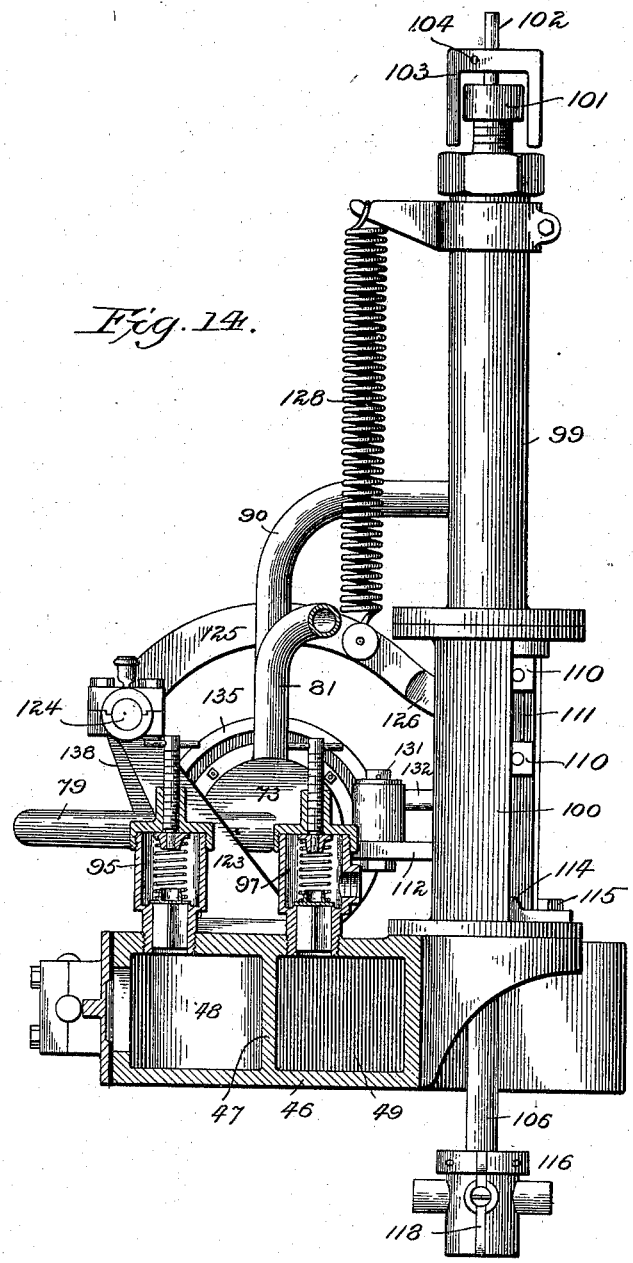

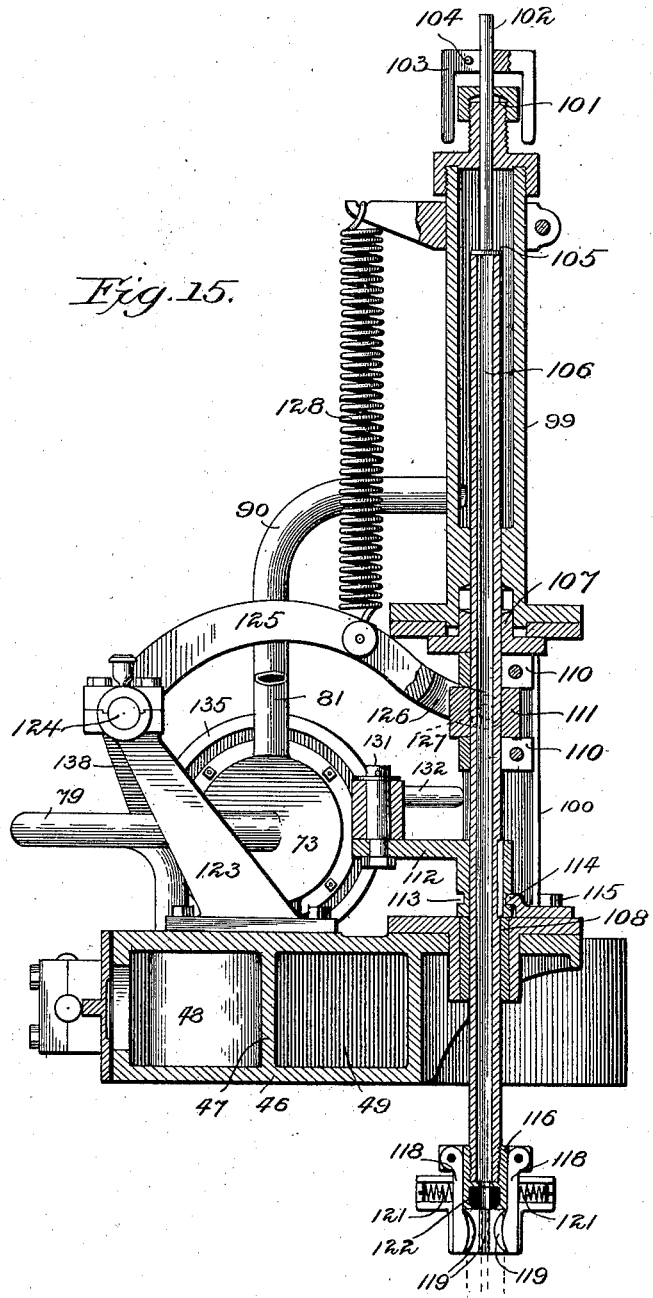

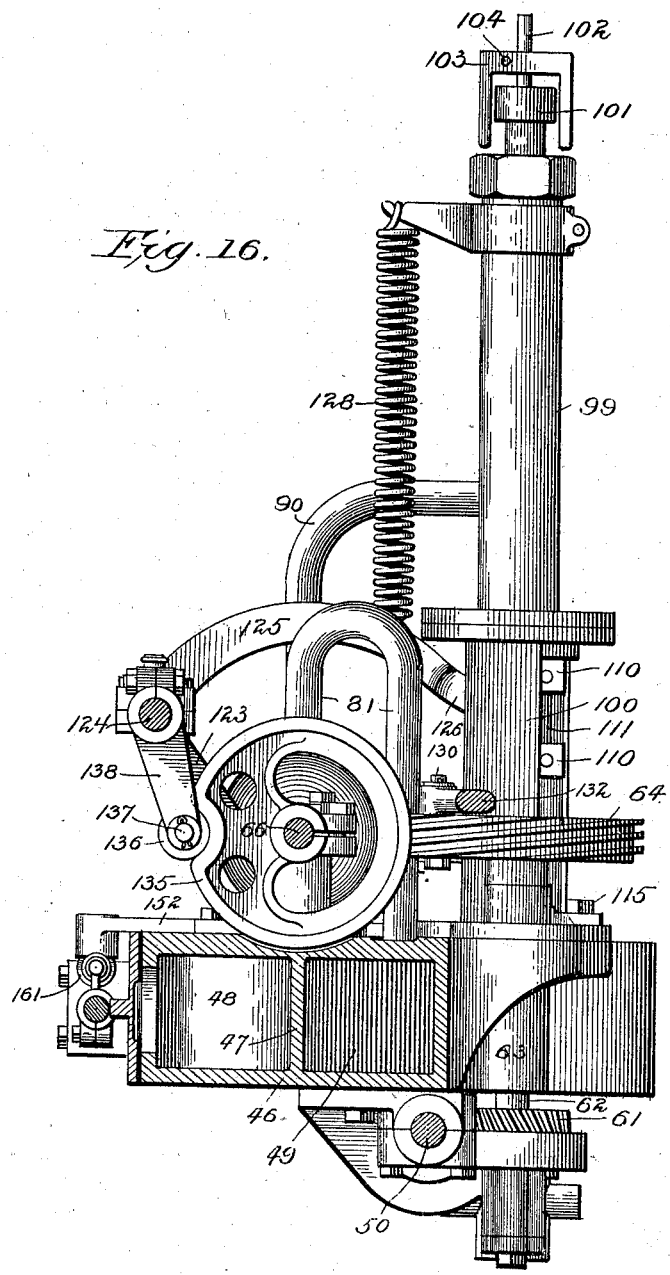

No. 671,100. Patented Apr. 2, 1901.
B. M. ASLAKSON.
GLASS BLOWING MACHINE.
(Application filed Aug. 15, 1900.)
(No Model.) 19 Sheets—Sheet 12.
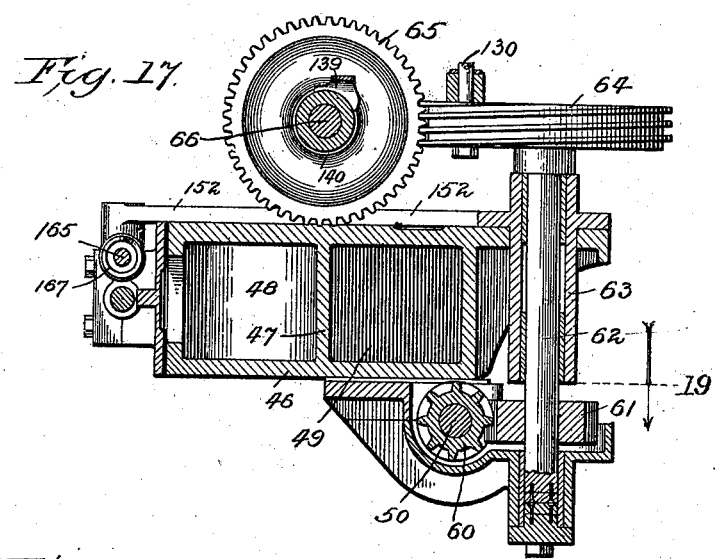
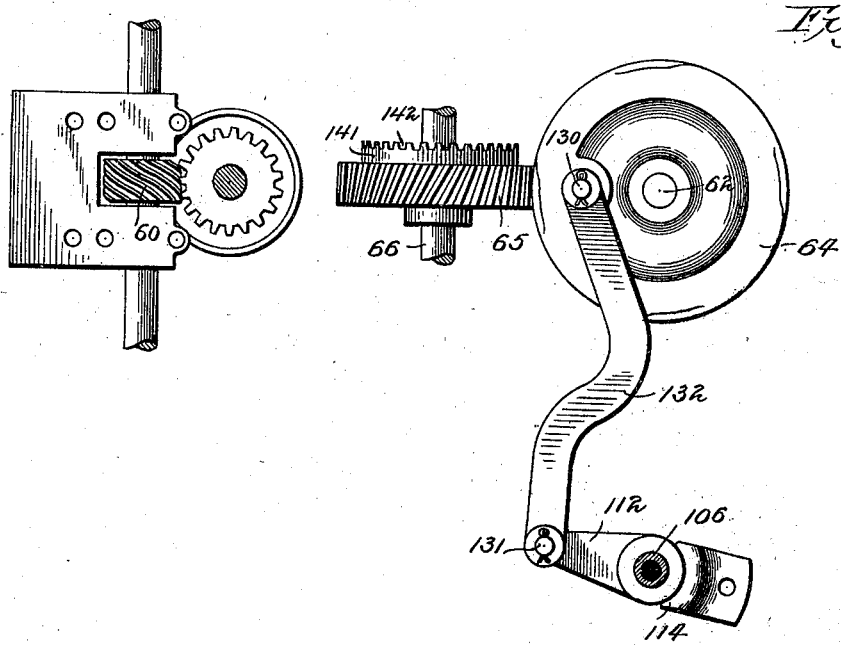
Witnesses:
Inventor:
Baxter Martin Aslakson,
By Dwight B Cheever
Att'y.
THE NORRIS PETERS CO., PHOTO-LITHO., WASHINGTON, D. C.

No. 671,100. Patented Apr. 2, 1901.
B. M. ASLAKSON.
GLASS BLOWING MACHINE.
(Application filed Aug. 15, 1900.)
(No Model.) 19 Sheets—Sheet 13.

Witnesses:
Inventor:
Baxter Martin Aslakson,
By Dwight B. Cheever
Att'y.

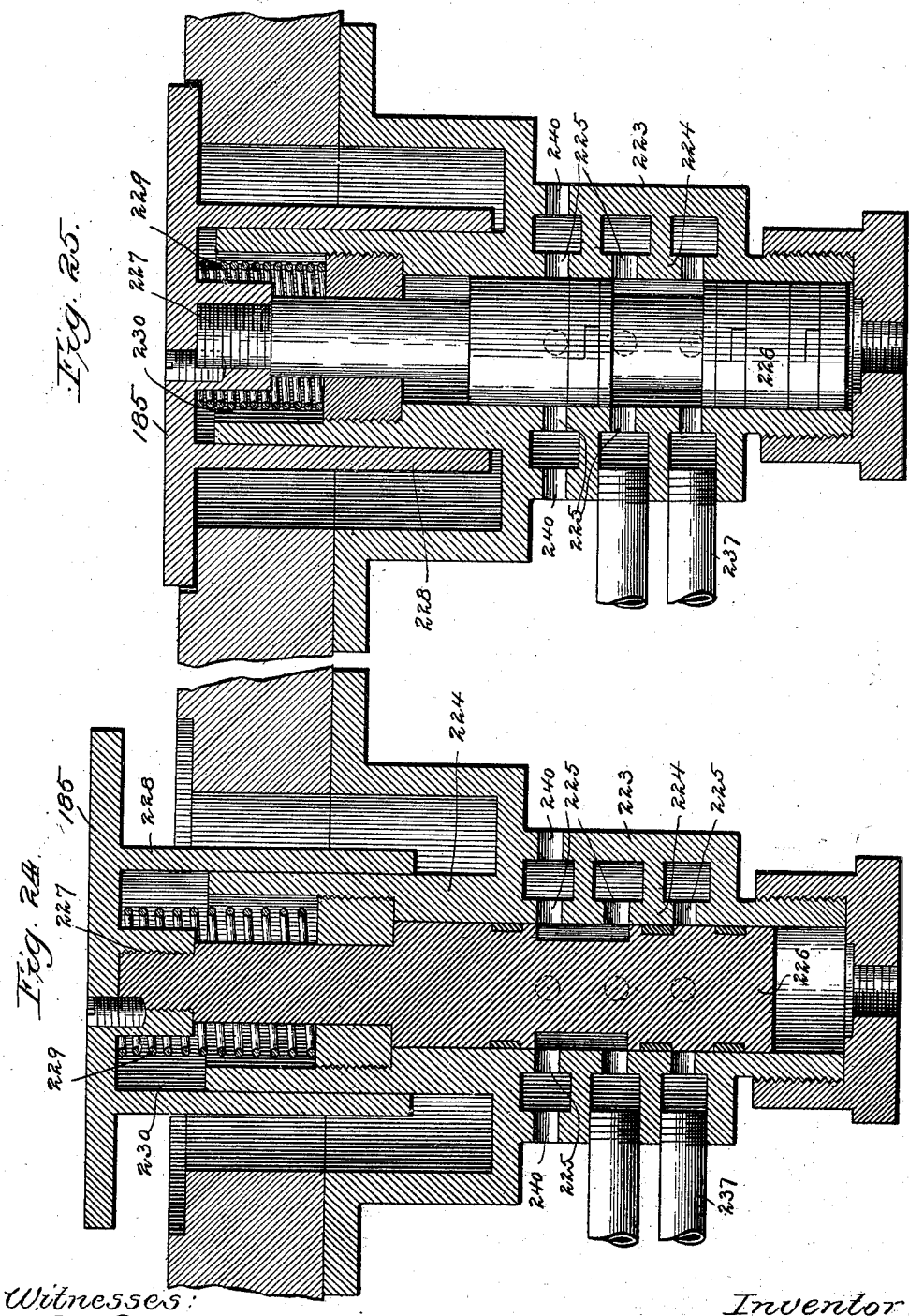

No. 671,100. Patented Apr. 2, 1901.
B. M. ASLAKSON.
GLASS BLOWING MACHINE.
(Application filed Aug. 15, 1900.)
(No Model.) 19 Sheets—Sheet 15.
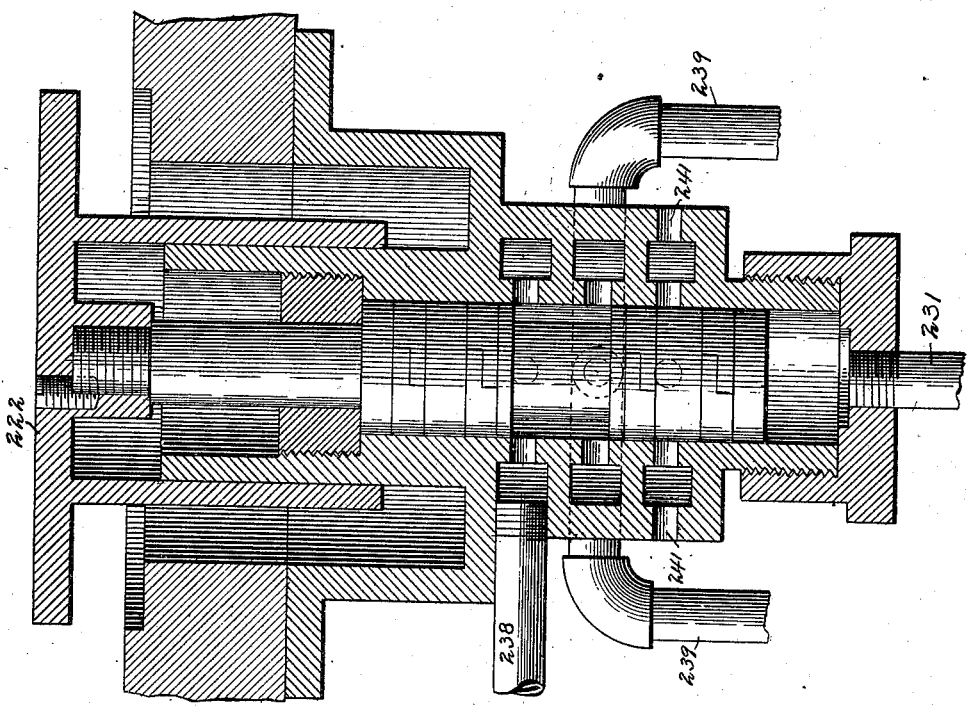
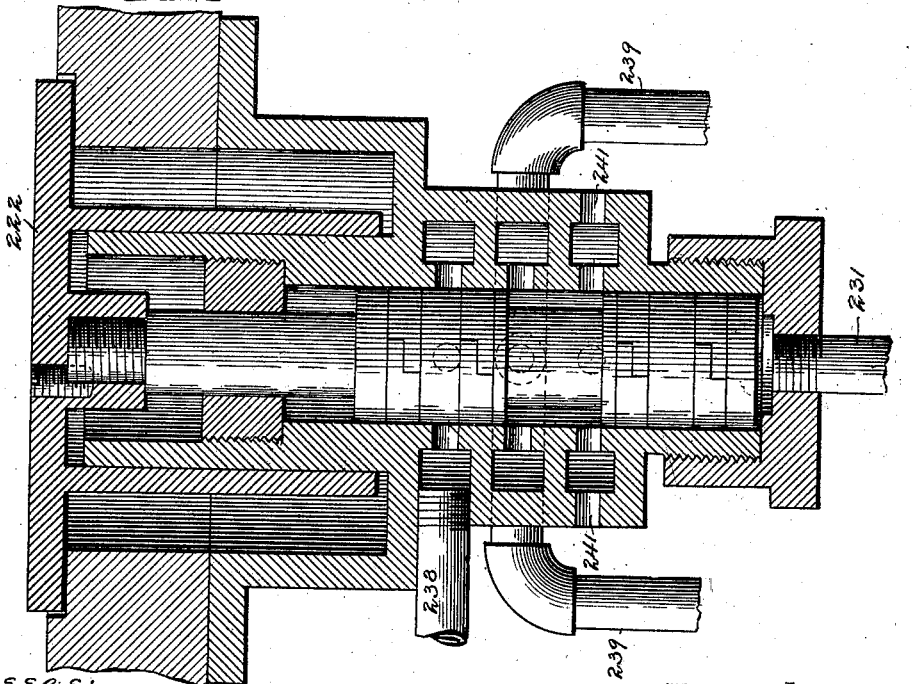
Witnesses:
Inventor
Baxter Martin Aslakson,
By Dwight B. Cheever
Att'y No. 671,100. Patented Apr. 2, 1901.
B. M. ASLAKSON.
GLASS BLOWING MACHINE.
(Application filed Aug. 15, 1900.)
(No Model.) 19 Sheets—Sheet 16.
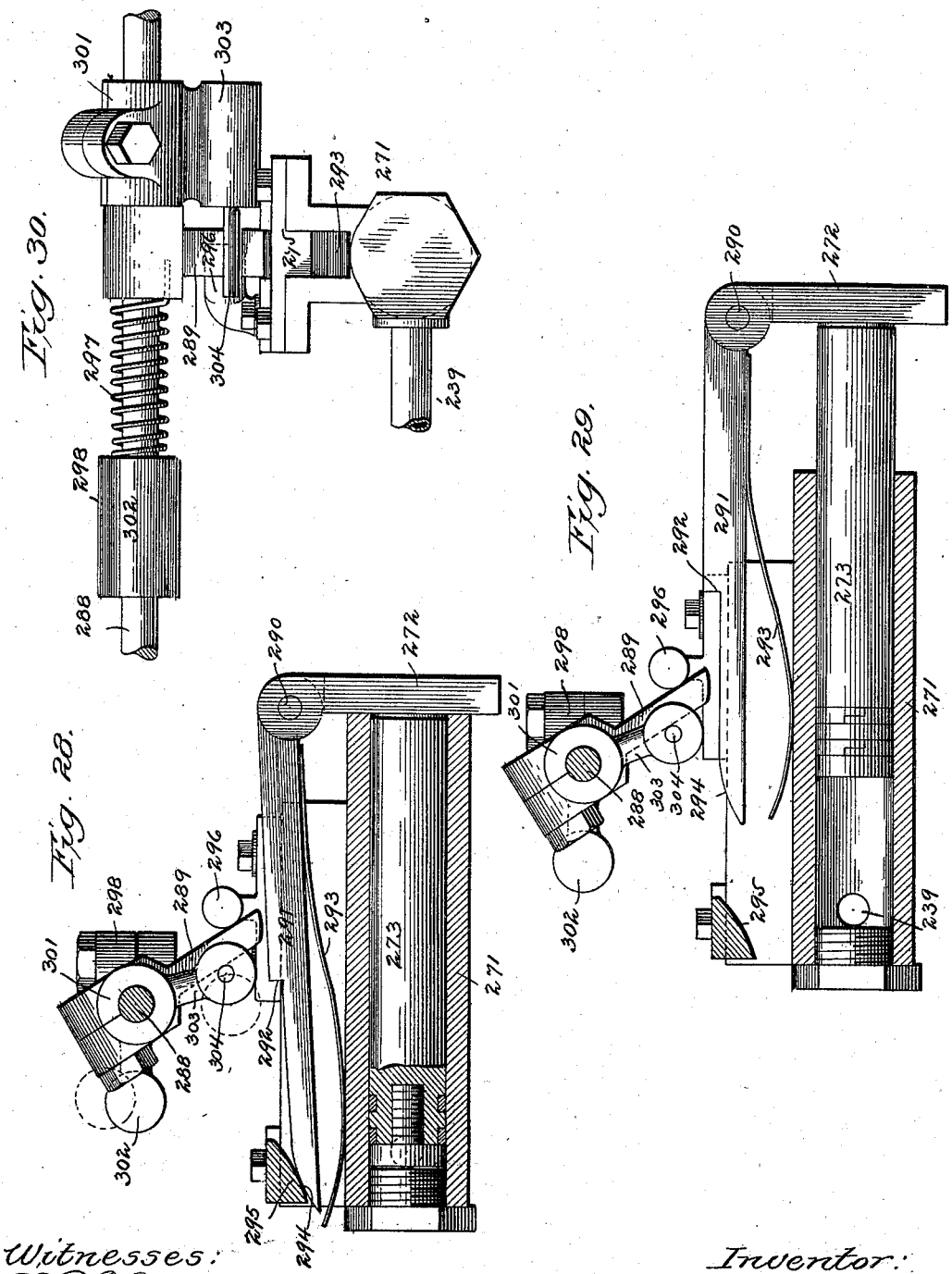

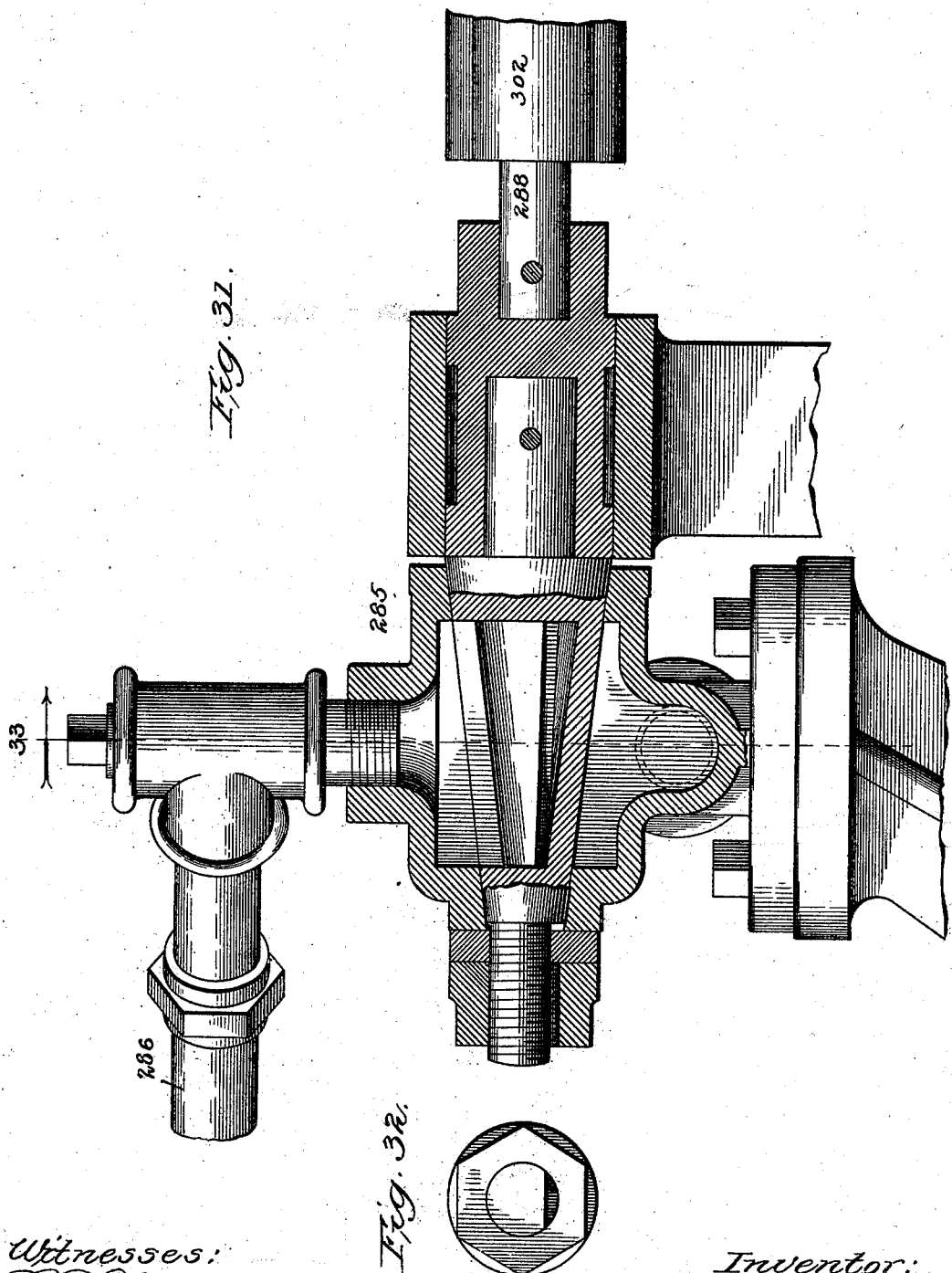

No. 671,100. Patented Apr. 2, 1901.
B. M. ASLAKSON.
GLASS BLOWING MACHINE.
(Application filed Aug. 15, 1900.)
(No Model.) 19 Sheets—Sheet 18.
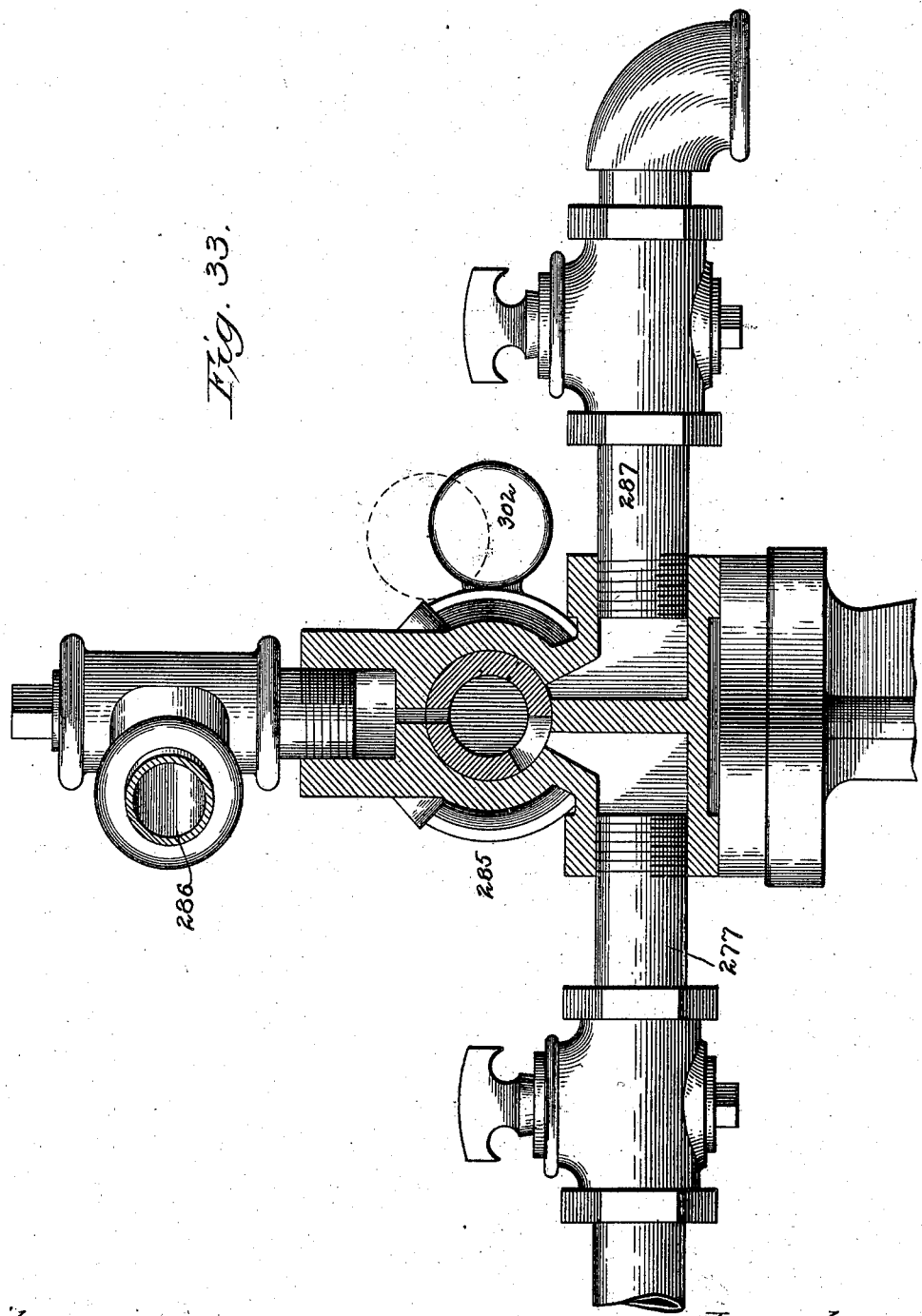

No. 671,100. Patented Apr. 2, 1901.
B. M. ASLAKSON.
GLASS BLOWING MACHINE.
(Application filed Aug. 15, 1900.)
(No Model.) 19 Sheets—Sheet 19.

Witnesses:
Inventor:
Baxter Martin Aslakson,
By Dwight B. Cheever
Att'y

UNITED STATES PATENT OFFICE.

BAXTER MARTIN ASLAKSON, OF ALEXANDRIA, INDIANA, ASSIGNOR TO THE LIPPINCOTT GLASS CO., OF SAME PLACE AND CINCINNATI, OHIO.

GLASS-BLOWING MACHINE.

SPECIFICATION forming part of Letters Patent No. 671,100, dated April 2, 1901.

Application filed August 15, 1900. Serial No. 26,947. (No model.)

*To all whom it may concern:*

Be it known that I, BAXTER MARTIN ASLAKSON, a citizen of the United States, residing at Alexandria, in the county of Madison and State of Indiana, have invented a new and useful Glass-Blowing Machine, of which the following is a specification in its best form now known to me, reference being had to the accompanying drawings.
My invention relates to machines for blowing glass. Automatic machines have been invented and used to some extent in which all the operations of the machine are performed automatically and in rigid succession;
but as the glass has to be prepared by hand and blown to a certain extent before it can be put in the machine it is very difficult, if not impossible, for the operator to always have the glass ready for the machine at the exact moment when the machine in its cycle of automatic movements is ready to receive the glass, with the result that the glass is inserted in the mold while too hot or too cold or before it is sufficiently blown, with the result that the finished product of the operation is imperfect in one or more ways.

One object of my invention is to provide a machine which shall possess all of the advantages of an automatic machine, while doing away with the above-mentioned serious disadvantage, by placing the several parts of the machine under the direct and absolute control of the several men operating the machine.
Another object of my invention is to provide a machine which can be simply and cheaply constructed to be operated by low-priced labor.

My invention also consists in many details of construction hereinafter more fully described and claimed.

My invention is primarily designed for making lamp-chimneys, and it will be so described; but it will be seen that it may be used for blowing almost all other kinds of glass articles and articles made of other plastic materials than glass which require blowing in the process of formation.

Figure 2:
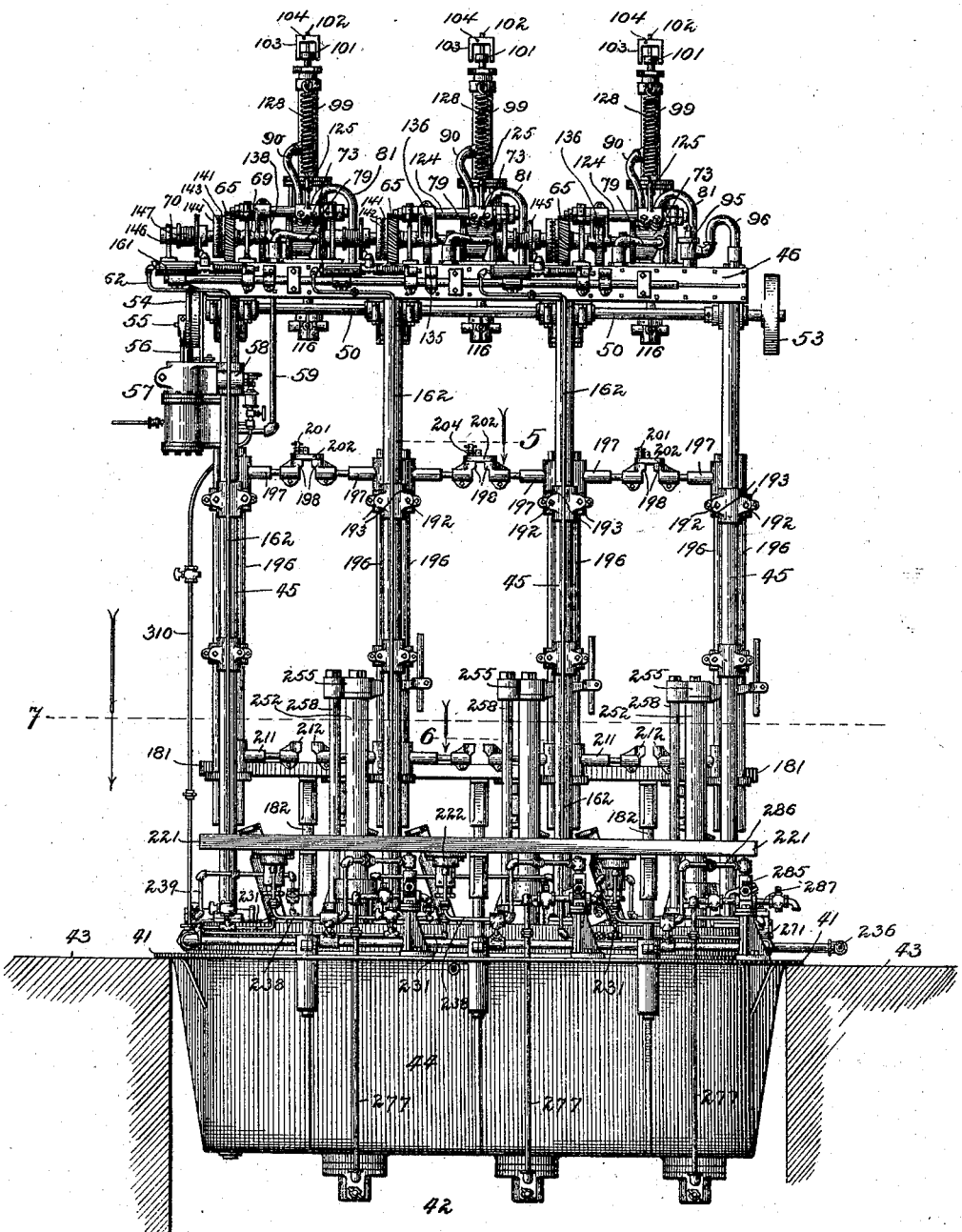
Figure 3:
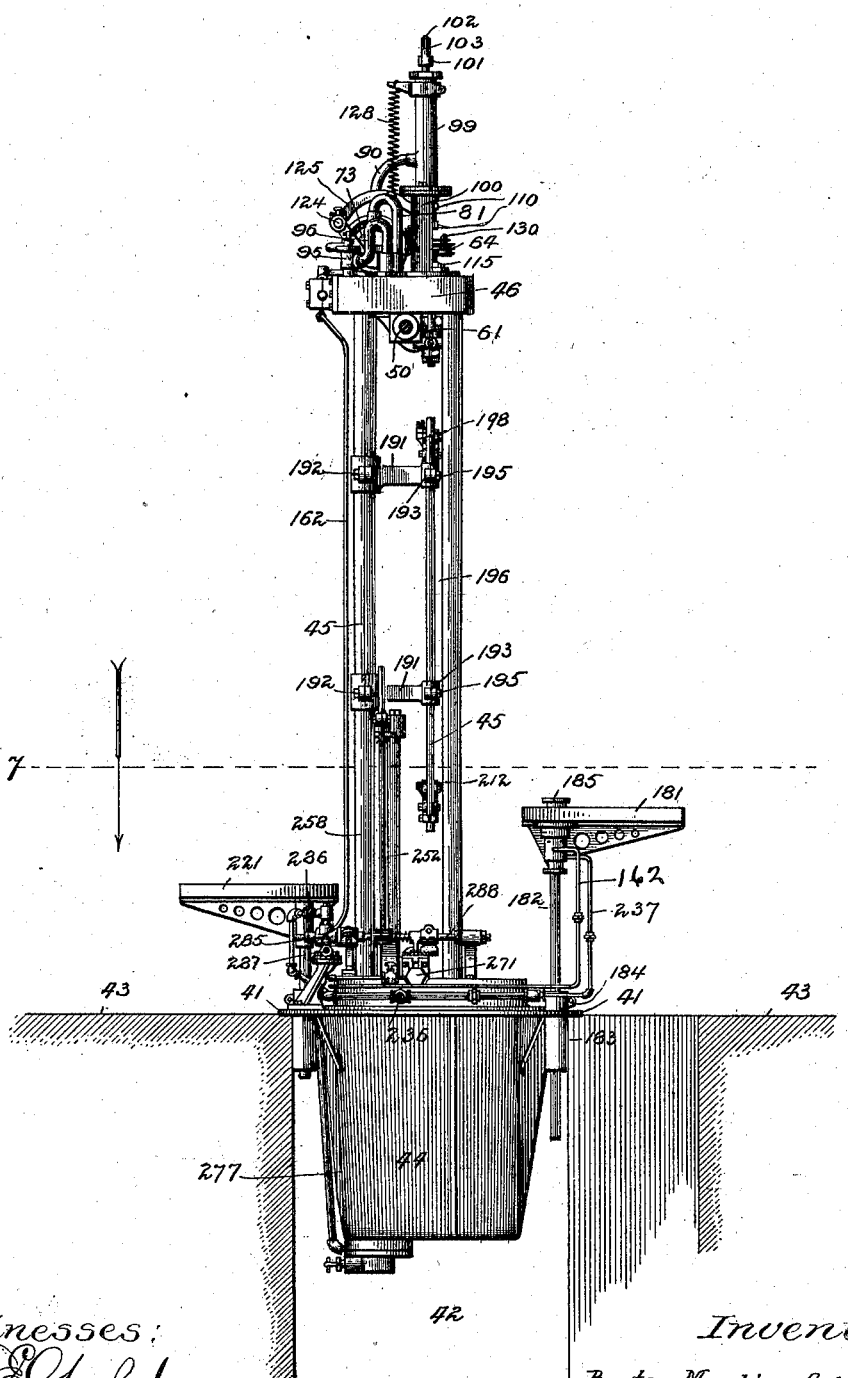
Figure 7:
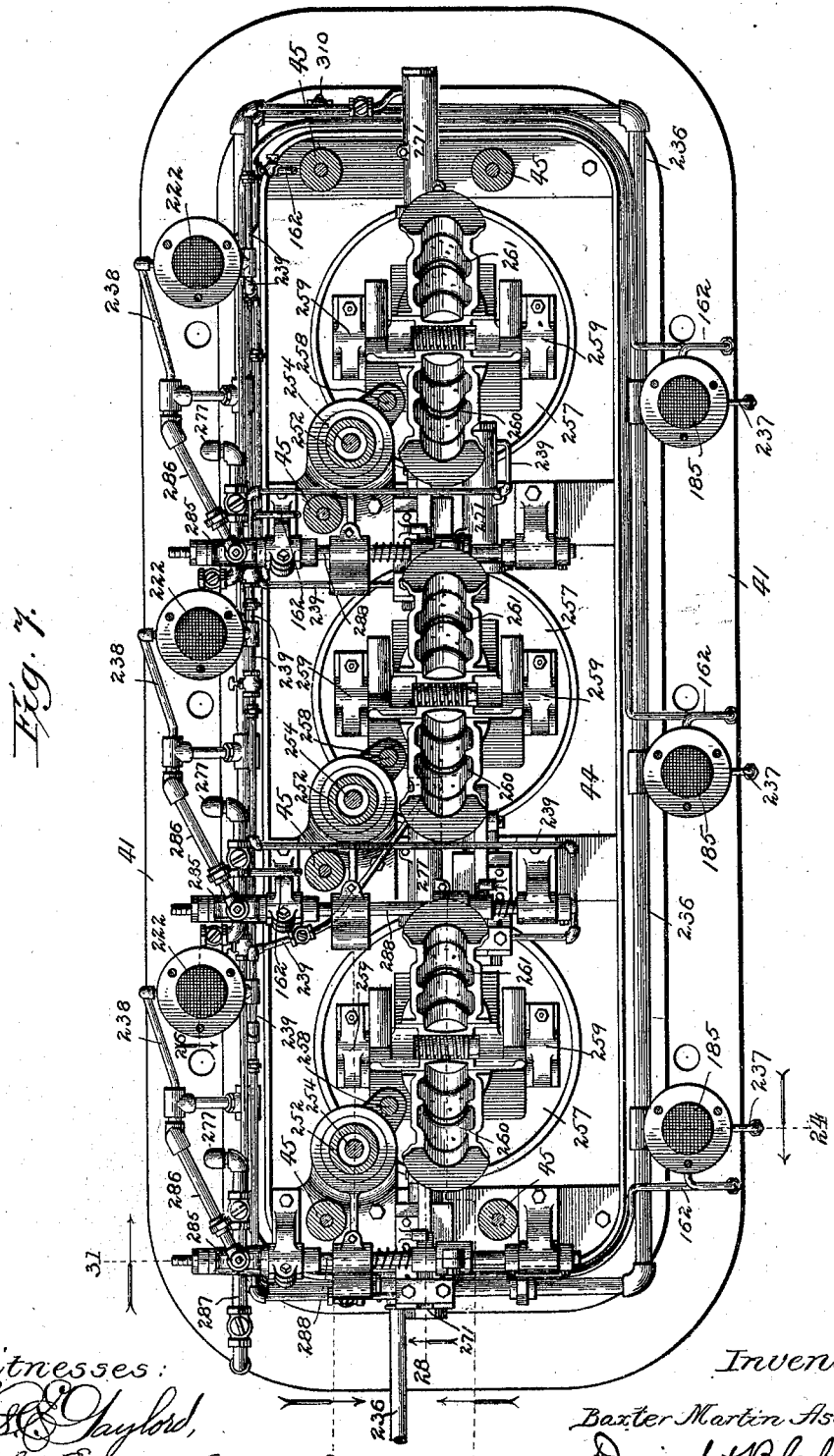
Figure 8:
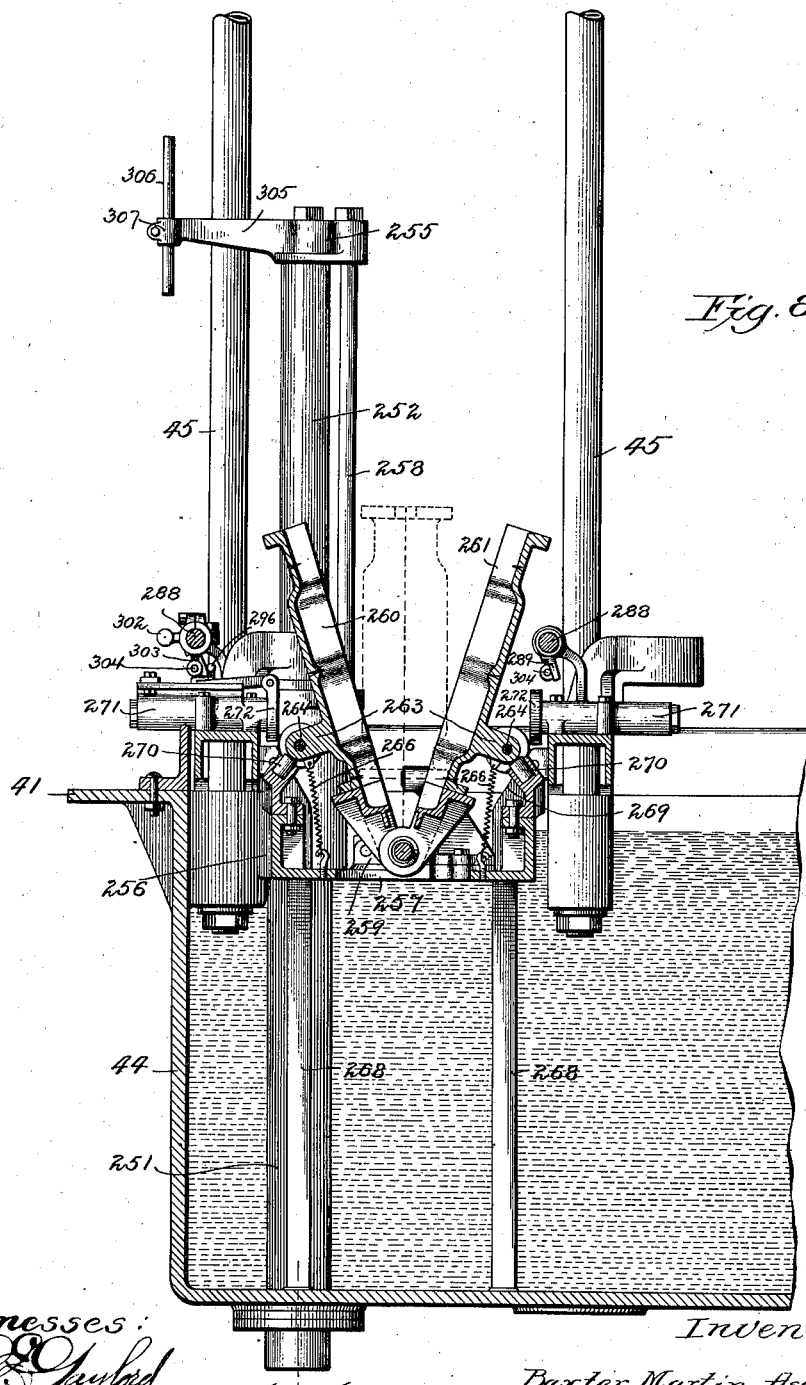
Figure 20:
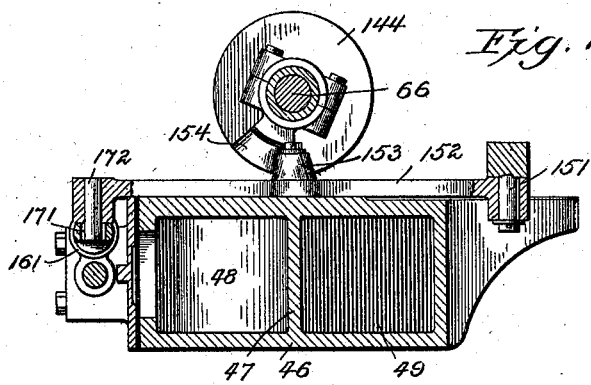
Figure 21:
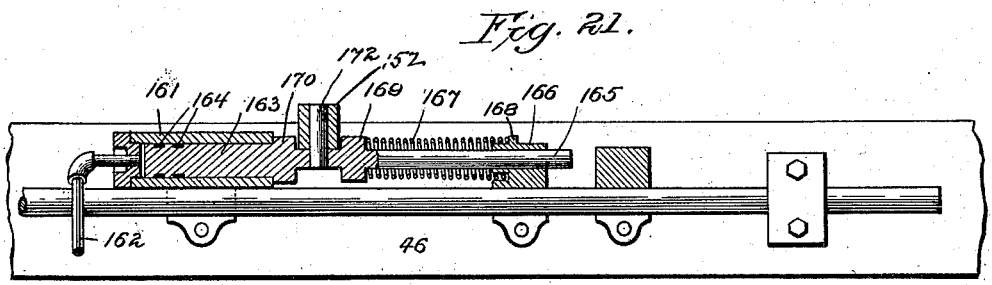
Figure 22:
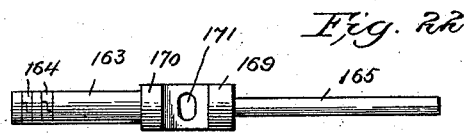
Figure 23:
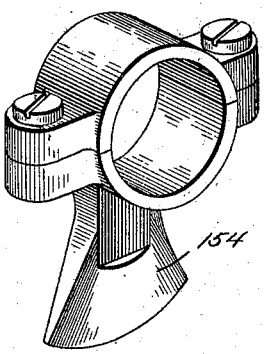
Figure 35:
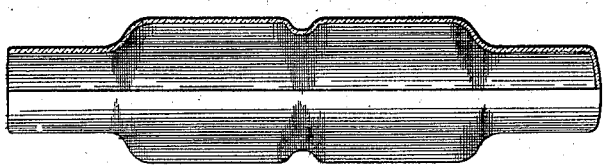
Figure 34:
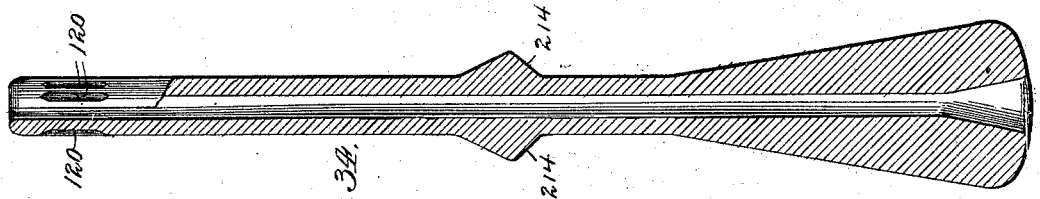
Figure 36:
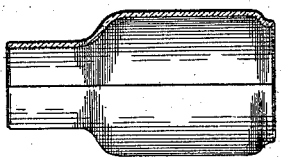
Figure 37:

In the drawings, Figure 1 is a front, Fig. 2 a rear, and Fig. 3 an end view of my machine. Fig. 4 is a plan view of the upper portion of my machine. Figs. 5 and 6 are detail plan views on lines 5 and 6, respectively, of Fig. 1. Fig. 7 is a plan view of the machine on line 7, Fig. 1, with the part shown in Fig. 6 removed. Fig. 8 is a front detail sectional view on line 8 of Fig. 7, showing the mold in position to receive the glass. Fig. 9 is a rear detail sectional view on line 9 of Fig. 7, showing the molds lowered into the water to cool them. Fig. 10 is a detail sectional view of the bottom of the cylinder on line 10 of Fig. 8. Fig. 11 is a detail sectional view of the blower mechanism taken on line 11 of Fig. 4. Fig. 12 is a sectional view of the blower-valve on line 12 of Fig. 11. Fig. 13 is a detail of the valve-disk of the blower mechanism. Figs. 14, 15, 16, and 17 are enlarged sectional views of the blowing mechanism, taken on the lines 14, 15, 16, and 17, respectively, of Fig. 4. Fig. 18 is a detail view of the mechanism for oscillating the blowpipe. Fig. 19 is a detail plan view of the worm-wheel and pinion on line 19 of Fig. 17. Figs. 20 and 21 are detail sectional views on lines 20 and 21, respectively, of Fig. 4, showing the cam and roller and the air-cylinder which operates them. Fig. 22 is a plan view of the piston and piston-rod. Fig. 23 is a detail of the cam appearing at the top of Fig. 20. Fig. 24 is a detail sectional view taken on line 24 of Fig. 7, showing the feeder-valve, and Fig. 25 shows the same valve after it has been depressed—*i. e.*, at the opposite end of its stroke. Figs. 26 and 27 are corresponding views of the remover's valve at the back of the machine for lowering the mold, taken on line 26 of Fig. 7. Figs. 28 and 29 are sectional detail views of the air-cylinder and piston for opening and closing the molds and connecting mechanism, taken on line 28 of Fig. 7, showing the positions of the parts at different positions of the piston. Fig. 30 is an end view of Fig. 28. Fig. 31 is a detail sectional view of the three-way valve for controlling the air in the cylinders which operate the molds. Fig. 32 is a partial end view of Fig. 31. Fig. 33 is a detail sectional view taken on line 33 of Fig. 31. Fig. 34 is a removable blowpipe, shown in section. Fig. 35 shows two chimneys as taken from the machine. Fig. 36 shows a finished chimney, and Fig. 37 is an indicator-card taken from a working machine in which the horizontal distances represent time and the vertical distances represent the pressure in the inside of the chimneys while being blown.

In order to make the technical description which follows more easily understood by the reader who examines the drawings for the first time, I will at this point give a very general description of the machine and its operation.

The machine, taken horizontally, Figs. 1 and 2, consists of three distinct, but duplicate, units which may be operated by different workmen in unison or in succession by one workman, so that for the purposes of description only one unit need be considered. Vertically the machine is also divided into three parts—first, the mechanism at the top of the machine for furnishing and controlling the air in the chimney being blown and for oscillating the chimney while being blown; second, the mechanism in the middle of the machine for holding the blowpipe, Figs. 5 and 6, and, third, the molds, with water-tank and mechanism for dipping the molds in the water of the tank at the bottom of the machine, Fig. 7. On the front of the machine is a platform, Figs. 1 and 3, on which the man who does the preliminary blowing and inserts the glass in the machine, known as the "feeder," stands. In this platform there is the feeder's foot-valve. The feeder on this platform blows the glass by lung-power until it is in the proper condition, inserts the blowpipe in the holding mechanism with the glass between the halves of the molds, and steps on the feeder-valve. This closes the mold and at the same time starts the blowing mechanism at the top of the machine. The blowing mechanism continues until it is automatically stopped by mechanism in the machine, the mold remaining closed. At the rear of the machine is another platform, Figs. 2 and 3, on which stands another workman, known as the "remover." When the blowing is completed, as above described, and the remover is ready, he steps on the remover's foot-valve on this platform, which causes the molds to open and be lowered into the cooling-tank and returned to their first position. As soon as the molds open and before they start downward the remover on the back platform removes the blowpipe and finished article from the machine. When the molds return to their original position, the machine is ready to repeat the operation. The blowing is done and all the operations of the machine are preferably produced by compressed air; but other gases or liquids may of course be used. The blowing mechanism is driven by a compressed-air motor, but an electric motor or other source of power may be used without departing from my invention.

Supported by the flanges 41, resting on the edges of the pit 42, dug below the floor 43 of the shop, is the tank 44. Rigidly secured to the tank are the vertical hollow rods 45, forming the frame of the machine. Capping these rods and rigidly secured to their upper ends is the hollow cast-iron box 46. This box forms the base for the blowing mechanism proper, which, as heretofore described, is located at the top of the machine. This hollow box is divided lengthwise by a partition 47, so as to form two long air reservoirs or chambers 48 and 49, the former containing high-pressure and the latter low-pressure air. Mounted on the under side of box 46 and running the length of the machine is the line-shaft 50, at one end of which is the fly-wheel 53 and at the other end a wheel 54, having thereon a crank-pin 55, to which is connected the driving-rod 56, attached to the piston-rod of a compressed-air motor 57, which is rigidly secured to the rods 45 by means of the clamps 58. Any of the common forms of air-motor may be used in place of the particular motor shown. The exhaust-air from the cylinder of this motor passes through pipe 59 into the high-pressure reservoir 48 of box 46.

Keyed to the line-shaft 50 is the worm-pinion 60, Figs. 17, meshing in the small horizontal worm-wheel 61, keyed to the vertical shaft 62. This shaft is journaled in the bearing 63, mounted on the side of box 46, and has secured to its upper end the large worm-wheel 64, which meshes into the worm gear-wheel 65. This worm-wheel normally rotates freely on shaft 66, journaled in bearings 69 and 70 in the standards 71 and 72, rising from and rigidly secured to the top of box 46, Fig. 11. The line-shaft 50 and the connected gearing just described rotate continuously.

Rigidly secured to the top of box 46 is a cast-iron box 73, of circular cross-section, as shown in Fig. 12, hereinafter called the "blow-valve." This blow-valve is divided crosswise by the partition-wall 74, forming the seat of the valve-disk 86, and having therein the segmental openings 75 and 76. The chamber formed at the left of partition 74, Fig. 11, is also divided by the wall 77 into two chambers corresponding to the openings 75 and 76, above described. The chamber corresponding to the opening 75 is the high-pressure chamber and is connected through opening 78 and the pipe 79, Figs. 4 and 15, with the high-pressure chamber 48 of box 46. The chamber corresponding to opening 76 is the low-pressure chamber and is connected through the opening 80 and the pipe 81 to the low-pressure chamber 49 of box 46. The chamber 82, at the right of partition 74, Fig. 11, has in its end the stuffing-box 83, through which the shaft 66 enters the chamber. Rigidly connected to the end of shaft 66 is the plate 84, having rigidly secured thereto the driving-pins 85. At the opposite ends of these pins, not rigidly secured thereto, is the valve-disk 86, held against the valve-seat 74 by the springs 87 on the pins 85, so as to make an air-tight contact, while permitting the valve-disk to rotate with the shaft.

88 represents the recesses in the disk 86, in which pins 85 rest. In the valve-disk 86 is a series of holes 89, increasing successively in size and covering a sufficient arc to a very little more than reach from opening 75 to opening 76 in partition 74. As the disk 86 is rotated during part of the revolution while passing over opening 76 low-pressure air will pass through the holes 89 into the chamber 82 during another part of the revolution. While the holes are slightly over both 76 and 75 a mixture of high and low pressure air will pass through, and while passing over 75 alone only high-pressure air will be admitted. The air from chamber 82 is conducted through pipe 90, and mechanism to be hereinafter described to the article being blown.

By the valve construction and other mechanism just described I am able to supply a low pressure of air at the beginning of the blowing and a high pressure at the end, as the nature of the operation requires and as is done when the blowing is done with the lungs, as formerly. An actual indicator-card from an actual test of a working machine showing the variation in pressure appears in Fig. 37.

A regulating pop-valve 95 of the common type is inserted in the high-pressure chamber 48, as shown in Fig. 14, and is connected by pipe 96 to the low-pressure chamber, so that when the pressure in 46 exceeds the required amount of about eleven ounces per square inch the valve blows off and the air escapes into the low-pressure chamber 49. In the top of this low-pressure chamber 49 is another regulating pop-valve 97, exactly like 95, which blows off into the atmosphere and is so set that the pressure in the chamber 49 cannot get above the required amount of about three ounces per square inch.

Connected to the pipe 90, above referred to, is the vertical hollow tube 99, which rests on and is secured to the casting 100 on the top of box 46. At the top of tube 99 is the stuffing-box 101, through which slides the valve-rod 102, which is held down by the weight 103, secured to it by the pin 104. On the lower end of valve-rod 102 and within the tube 99 is the circular valve-disk 105, adapted to normally close the end of the hollow tube 106, which is adapted to be oscillated on its axis and also to slide up and down through the stuffing-box 107 in the lower end of the tube 99 and the bearing 108 in the top of box 46. Rigidly secured to the tube 106 are the adjustable split collars 110, which hold between them the collar 111.

Mounted on the hollow tube 106 is the crank-arm 112. This tube is splined to this crank-arm in such a way that rocking the crank-arm will oscillate the tube; but the tube is free to slide up and down through the center of the crank-arm, thereby allowing the air-tube 106 to be raised and lowered as required while being oscillated. The crank-arm 112 has cut in it a circular groove 113, in which fits the projection 114, which is rigidly secured to the top of the box 46 by means of the bolt 115, so that the arm 112 is free to rock, but cannot move up and down with the tube 106.

To the lower end of tube 106 is screwed a chuck 116, which forms the coupling adapted to receive the upper end of the blowpipe proper. Pivoted to the upper part of this chuck are the dogs or catches 118, which have at their lower ends the projections 119, which are adapted to fit in slots 120, Fig. 34, in the end of the regular blowpipe. These catches 118 are normally pressed inward by springs 121. These springs are light enough so that the blowpipe illustrated in Fig. 34 may be easily inserted between the catches, and yet are strong enough so the catches will set in place in the notches 120 in the blowpipe and cause it and the glass article attached to it to oscillate in unison with the pipe 106.

122 indicates a rubber bushing or packing adapted to make an air-tight joint between the air-tube 106 and the regular blowpipe (illustrated in Fig. 34) when they are brought together in the manner just described.

123 represents a journal-standard, Fig. 15, rising from and rigidly secured to the top of box 46, in which is journaled the shaft 124. Rigidly secured to this shaft is the rocker-arm 125, having forked ends 126. In the ends of these forks 126 are two pins 127, which fit into slots in the sides of collar 111, attached to tube 106. The result is that when arm 125 is rocked up and down with shaft 124 as a center the tube 106 is moved up and down. The arm 125 is normally held up by the spring 128.

On worm-wheel 64 is the crank-pin 130, and on arm 112 is another crank-pin 131, the two being connected together by the rod 132. The crank-pin 130 is set at a much shorter distance from the center of wheel 64 than the length of the arm 112, (the distance from the center of tube 106 to the center of crank-pin 131,) with the result that the rotation of wheel 64 gives the arm 112, and consequently the tube 106, an oscillating motion. Manifestly this motion may be produced by putting a splined pinion on the tube 106 and having a reciprocating rack work against it.

Keyed to shaft 66 is a cam 135, which, as illustrated in Fig. 16, is a circle, except at one point, where it is indented to receive the roller 136, which is journaled at 137 to the arm 138, rigidly secured to the shaft 124. As heretofore described, this shaft has rigidly secured to it the arm 125, sustained by the spring 128, the result being that the roller 136 is normally held in the notch in cam 135 by means of said spring.

Gear 65 rotates freely on shaft 66 and is prevented from sliding endwise by a piece 139, rigidly secured to the bearing 69 and having its end fitting in a groove 140 in the hub of gear 65. On the front of gear 65 is a disk 141, having therein teeth 142, adapted to mesh into teeth 143 in clutch-plate 144, which is splined to shaft 66, so that it is free to move endwise, but always turns with the shaft 66. Integral with plate 144 is another plate 145. Keyed to the shaft 66 is a collar 146. Between plate 145 and the collar 146 is a spring 147, which at all times exerts a pressure tending to force clutch-plates 144 and 145, Fig. 11, to the left, and thereby force teeth 142 and 143 into mesh with each other.

Pivoted to the post 151, Fig. 20, on the top of box 46 is a bar 152, which extends across the top of box 46 and has its other end connected to an air-cylinder or piston in a manner hereinafter to be described. On this bar 152 is a conical cam-roller 153, against which the face of the cam 154 on the inside of plate 145 normally rests, Fig. 11, whereby the clutch 143 147 is normally held out of engagement with the teeth 142 on the wheel 65.

At the rear of box 46 is a small air-cylinder 161. (Shown in perspective in Fig. 2 and in section in Fig. 21.) Compressed air is admitted to this cylinder through the pipe 162. Extending from the piston 163, which is packed by the rings 164, is the piston-rod 165, guided at its outer end through the block 166, rigidly secured to the box 46. This piston and piston-rod are normally held in the position shown in Fig. 21 by means of the spring 167 on the piston-rod 165, which abuts against the flange 168 on the block 166 and the flange 169, which is integral with the piston-rod. The piston is prevented from being driven too far in the cylinder by means of another flange 170. Between the flanges 169 and 170 the piston-rod is flattened and has the slot 171 cut in it. In this slot is inserted the pin 172, rigidly secured to the end of the bar 152, heretofore described. This slot is elongated, so as to allow for the arc described by the pin 172 when the bar 152 is moved about its center 151, as heretofore described.

In front of the machine is the feeder-platform 181, on which the workman who feeds the machine, technically known as the "feeder," stands. This platform is supported on the rods 182, which pass through clamps 183, where they are held adjustably by the bolts 184. By loosening these bolts the height of the platform may be varied, if desired. On this platform there is a feeder's valve 185, whose internal mechanism is shown in Figs. 24 and 25, the former being the normal position of the valve, the latter the position when depressed. This feeder's valve is directly connected to the cylinder 161 through the pipe 162, the pipe extending, as shown in Fig. 1, down from one side of the valve to the upper edge of the tank 44, along this upper edge around the end of the machine, as shown in Fig. 3, and thence up one of the upright columns of the machine to the cylinder, as shown in Fig. 2.

Clamped to the rods 45 on the rear of the machine are arms 191, as shown in Fig. 3. These clamps are adjustable and by adjusting the bolt 192 may be moved up and down. On the forward end of these arms 191 are other clamps 193, which are adjustable by means of bolt 195. In these clamps 193 are vertical rods 196. Supported at the upper ends of the rods 196 are the horizontal bars 197. (Illustrated in Fig. 5.) These two bars 197 have at the point at which they approach each other the jaws 198, between which the removable blowpipe (illustrated in Fig. 34) fits and is normally held under tube 106, heretofore described. These jaws are shaped as shown in Fig. 5, and the distance between the inside faces may be varied to accommodate different-sized blowpipes by adjusting their position on the arms 197 by means of the bolts 199.

In order to more easily direct the reception of the blowpipe, the front pieces of the jaws are bent outward in the lines 200, as shown. Pivoted to one of the jaws by bolt 201 is the latch 202, normally held against the pin 203 on the opposite jaw by means of the coil-spring 204. This spring is of such strength and construction that when the blowpipe is inserted between the jaws this latch will hold it against any extraordinary pressure tending to shove the blowpipe through beyond the jaws, but has not strength enough to prevent the workman behind the machine, known as the "remover," from easily drawing the blowpipe toward the rear of the machine whenever he desires to remove the blowpipe with the glass attached.

At the lower end of the rod 196 is supported another set of bars 211, having their jaws in the same line and corresponding exactly in construction with the jaws 198 just described, except that the latch 202 is omitted and that the tops of the jaws have hollow portions 213, adapted to receive and hold the conical enlargements 214 on the blowpipe, as illustrated in Fig. 34. These two sets of jaws 198 and 212 are arranged directly under the pipe 106, heretofore described, so that when the removable blowpipe is inserted in these jaws and the tube 106 is lowered the chuck 116 and other mechanism heretofore described and shown in detail in Fig. 15 will fit over the top of the blowpipe and make an air-tight joint therewith.

Adjustably supported at the rear of the machine, in substantially the same manner as the platform 181 on the front of the machine, is another platform 221, on which the man or boy who removes the glass from the machine, technically known as the "remover," stands. On this platform is a foot-valve 222, known as the "remover's" foot-valve, as illustrated in Figs. 26 and 27.

The feeder's valve (shown in Figs. 24 and 25) and the remover's valve (shown in Figs. 26 and 27) are identical with each other in construction, with the exception of the fact that the feeder's valve has a spring adapted to hold the valve in its highest position at all times except when the foot of the feeder is upon it, while the remover's valve remains in the position in which it is set until some external force acts upon it to change that position. These valves consist, essentially, of the case 223, having the various pipe connections shown. In this case is the flange 224, in the sides of which are cut the hollow openings 225 for the purpose of making the valve connections with the various pipe-openings in the case 223. Inclosed in the case 223 and rigidly attached to the piston 226 by the screw-threads 227 is the treadle portion 228, on which the foot of the workman is placed when it is desired to operate the valve. As heretofore stated, the piston and treadle in the feeder's valve are normally held in their highest position by means of the spring 229, inclosed in chamber 230. The bottom of the remover's valve is connected by a pipe 231 to the pipe 162, which connects the feeder's valve and the cylinder 161, heretofore described, so that when the feeder's valve is raised, as in Fig. 24, the remover's valve is depressed, as in Fig. 26, and when the feeder's valve is depressed, as in Fig. 25, (thereby admitting air to the piston in cylinder 161 and to bottom of the piston of the remover's valve,) the remover's valve is raised to the position shown in Fig. 27, where it remains until the remover depresses it.

As heretofore stated, the entire machine is operated by compressed air, it being conducted from a suitable compressor to the machine through the pipe 236, inclosing the base of the machine. This main air-pipe is connected to the feeder's valve by the pipe 237 and is connected to the remover's valve by another pipe 238. The remover's valve is connected to mold-closing cylinders (to be hereinafter described) by the pipes 239. The number 240 indicates the exhaust-ports in the feeder's valve, and 241 indicates the exhaust-ports in the remover's valve.

Rising from and rigidly secured to the bottom of the tank 44 is a vertical cylinder 251, having therein the piston 252. This piston is hollow and runs the entire length of the cylinder, being packed at the bottom with the rings 253. Running through this piston 252 is the rod 254, to the upper end of which is screwed the cross-head 255. Inclosing the cylinder 251 and slidable thereon is the bearing 256. At the bottom of this bearing and integral with it is the platform 257, on which the molds are supported in the manner hereinafter described. Bearing 256 and platform 257 are rigidly connected to the cross-head 255 by the rod 258, so that the movement of the piston 252 in the cylinder 251 causes a corresponding movement up and down the platform 257 and the molds thereon.

Rigidly secured to the platform 257 is the bearing 259, on which are pivotally mounted the molds 260 and 261. The term "mold" as used in this specification indicates a mold-section or half of a complete mold. These half-molds when closed form the complete mold inclosing the glass article to be blown. As is usual with such molds, they are lined with a composition made of the paste which all glass-blowers use. These molds have in their sides small holes 262, which act as vents. Extending from each mold is an arm 263, on which is journaled at 264 the roller 265. These arms 263 are connected with the bottom of the platform 257 by a tension-spring 266, so that the molds are normally held open. Rising from the bottom of the tank 44 are two tracks 268, on which the rollers 265 are adapted to travel. These tracks are rigidly secured to the bottom of the tank and to the upright rods 45. They are so placed that when the molds are lowered in the tank they are confined in the position shown in Fig. 9—*i. e.*, about half-closed—so that the water can pass between the molds and cool them. The upper portion of the track 268 curves outward at 269, so that as the rollers travel over this portion the molds open to their full width, as shown in Fig. 8.

Attached to the platform 257 are stops 270, against which arms 263 rest when the molds are fully open, as shown in Fig. 8, thereby preventing the molds opening too far.

Rigidly secured at the top of the tank are the air-cylinders 271, to the pistons of which are secured the plates 272, adapted to bear against the rollers 265 when the molds are at their highest position, whereby when air is admitted to the cylinders 271 through the pipe 239 and the plates 272 are driven toward each other the molds are closed and held tightly together.

The pistons in the cylinders 271, with the plates 272 on the ends of the pistons, are arranged in a vertical plane with the track 268, so that as the platform 257, with the molds thereon, is raised the rollers 265 run off from the track 268 onto the faces of the plates 272. When the air is exhausted from the cylinders 271, the springs 266 cause the molds to open and at the same time force the plates 272 and pistons in cylinders 271 back to their original position, as shown in Figs. 8 and 9. These cylinders 271 are connected by the pipes 239 to the remover's valve.

Fig. 10 illustrates a cushioning device at the bottom of the cylinder 251. 276 is a large passage in the cylinder connected with the pipe 277, through which air is admitted to and forced out of the bottom of the cylinder. This opening is placed a little distance from the bottom of the cylinder, as shown. At the very bottom of the cylinder is another and smaller opening 279, connecting at 280 with the opening 276. The size of the opening 279 may be varied at pleasure by adjusting the screw 281, and in practice the passage is made quite small as compared with the area of 276. When the piston 252 passes the lower edge of the opening 276, the large volume of air is confined between the bottom of the piston and the bottom of the cylinder. This air can only escape through the small opening in pipe 279 280, and as it is forced to do so gradually the motion of the cylinder, and consequently of the molds, is retarded until the piston reaches the bottom of the cylinder, when the molds stop altogether. When air is admitted through pipe 277, it can at first only get under the bottom of the cylinder through the opening 279 280, and the cylinder therefore moves very slowly until after it passes the opening 276, when the full volume of air in the pipe is admitted, and the cylinder, and consequently the molds, then receive their maximum speed upward.

The pipe 277 connects with the three-way valve 285, which is a three-way valve of the ordinary form of construction with some slight modifications in the design to meet the requirements of the machine. The valve is shown in detail in Figs. 31, 32, and 33. This three-way valve is connected by pipe 286 with the main air-pipe 236, heretofore described. 287 is the exhaust-pipe from the three-way valve. It will therefore be seen that when this three-way valve is turned in one position air from the main air-pipe is admitted below the piston 252 in the cylinder 251 in the bottom of the tank and that when the three-way valve is turned in the reverse position the air under that piston is allowed to escape into the atmosphere through pipe 287, so that the piston and its attached mechanism may descend. The valve portion of this three-way valve 285 is attached to and operated by the shaft 288, which runs across the machine near one of the small cylinders 271, which opens and closes the mold. The relation of the two is shown best in Fig. 28, where 289 indicates a finger journaled on the shaft 288. Pivoted at 290 to the plate 272, heretofore described, is a catch 291, having therein a notch 292, adapted to engage the end of the finger 289. This catch 291 is normally held up in a horizontal position by a spring 293. The end of the catch is rounded off in a curve 294, adapted to bear against the cam 295, which is rigidly secured to the body of the machine.

296 represents a stop on the body of the machine, against which the finger 289 is normally held by the torsional spring 297 on the shaft 288, the opposite end of the spring being permanently secured in the hub 298 upon the shaft. Rigidly secured to the shaft 288 is the clamp 301 and the vertical arm 303. The vertical arm has extending from it a pin 304, engaging the back of the finger 289, and when the piston 273 and plate 272 start from the position shown in Fig. 29 and move to the left (the motion being caused by the opening of the molds under the action of the springs which control them) the notch 292 engages the lower end of the finger 289 and moves it, and consequently the arm 303, to the left, thereby rotating the shaft 288 and operating the three-way valve. When the curved portion 294 of the catch 291 strikes the cam 295, the catch is depressed sufficiently to release the finger 289 from the notch 292 and allow it to spring back against the stop 296, the arm 303, and consequently the valve, remaining stationary.

Extending from cross-head 255, attached to the top of piston 252, is the arm 305, having at its end the vertical rod 306, adjustable up and down in clamp 307. This rod is so adjusted that when the piston 252 descends in the cylinder and reaches the bottom the lower end of the rod 306 will strike the horizontal arm 302, extending from hub 298, secured to shaft 288, thereby rocking the clamp 301 and shaft 288 in the opposite direction from the motion given them by the catch 291 and reversing the three-way valve and admitting air from the main supply-pipe under the piston 252, thereby driving the piston and the attached mechanism upward.

The operation of my machine is as follows: Compressed air is admitted from a suitable air-compressor or other source of supply to the pipe 236 and from this pipe through the small pipe 310 to the air-motor 57, which rotates the line-shaft 50 and, as heretofore described, sets in motion the gears 64 and 65 and the shaft 66, thereby at the same time oscillating the arm 112 and the blowpipe-tube 106 and attached mechanism. These motions are continuous throughout the period the machine is being used. The feeder takes his position on the feeder-platform, and the remover takes his position on the remover-platform on the rear of the machine. Assistants dip the end of the removable blowpipe, Fig. 34, in the melted glass and manipulate it and blow it as is usual in the preliminary operations of blowing by hand. When the glass has reached the proper condition, the blowpipe is handed to the feeder, who finishes the preliminary manipulations, or, as it is technically called, "completes the swing." He then inserts the enlargement 214 of the blowpipe in the hollow 213 of the jaws 212 and presses the upper end of the blowpipe against the latch 202 in the jaws 198. This brings the glass on the end of the blow-pipe between the open molds, (the machine having been set in the position shown in Figs. 1, 2, and 3 before beginning operations.) It also brings the upper end of the blowpipe in line with the connecting-chuck 116 on the lower end of the tube 106. The feeder now steps on the treadle 185 of the feeder's valve and depresses it into the position shown in Fig. 25. This admits air through the pipe 237 from the air-compressor into the pipe 162, which, as heretofore described, is a branched pipe. Part of it goes to the bottom of the remover's valve, forcing it upward to the position shown in Fig. 27, thereby admitting air from the air-reservoir through pipe 238 into the pipes 239, which lead to the cylinders 271, thereby, in the manner before described, closing the molds on the glass. Simultaneously with this the air let into pipe 162 by depressing the feeder's valve drives the piston in cylinder 161 to the right, Fig. 21, against the action of the spring 167, thereby moving the bar 152 on its pivot 151 and releasing the cam 153, which holds back the clutch 143 147. As soon as this is accomplished the clutch moves to the left, Fig. 11, so that the teeth 143 engage the teeth 142 on the gear 65, which has been continuously rotating. This secures the shaft 66 to this gear, so that the shaft is set in motion. The feeder only keeps his foot upon the treadle of the feeder's valve for a moment, and upon releasing his foot the spring 229 forces the valve back to its original position, (shown in Fig. 24,) thereby cutting off the pressure of the air in the cylinder 161. The piston in the cylinder and the cam 153 are forced back to their original position by the spring 167; but before this is done the shaft 66 has rotated sufficiently so that the cam 154 is clear of cam-roller 153 and does not again engage with it until the shaft has completed its rotation, when the cam and cam-roller again engage and the clutch 143 146 is forced to the right, Fig. 11, against the action of the spring 147, and the teeth 143 are withdrawn from the teeth 142 and the shaft comes to a stop in the position shown in Fig. 11. As heretofore described, the exhaust-air from the motor 57 has been exhausted into the high-pressure chamber 48 in the box 46, and when the pressure in this box exceeds about eleven ounces the surplus is exhausted through the pop-valve 95 and the pipe 96 into the low-pressure chamber 49, where the pressure is maintained at about three ounces, and when the pressure exceeds this the surplus is blown off through the safety-valve 98 into the atmosphere, so that a pressure of three ounces is constantly maintained in the chamber 49 and the pressure of eleven ounces in the chamber 48. Of course these pressures may be varied to any extent required by adjusting the springs on the pop-valves. When shaft 46 is set in motion in the manner heretofore described, it sets in motion the cam 135, which is secured to it. This at once forces the roller 36 out of the notch in the cam, Fig. 16, thereby rocking the shaft 124 and causing the arm 125 to move downward against the action of spring 128. As heretofore described, the air-tube 106 is attached to this arm and moves downward with it, thereby bringing the chuck 116 over and in contact with the end of the removable blowpipe, which was inserted in the machine by the feeder, the projections 119 on the catches 118 engaging with the hollows 120 in the end of the blowpipe and the end of the blowpipe fitting against the rubber packing 126. It will be remembered that this pipe 106 is constantly oscillating under the action of the arm 112, propelled in the manner heretofore described, and as soon as the chuck takes hold of the blowpipe in the manner just described the blowpipe and the glass upon its lower end, which is in the closed molds, is also given this oscillating motion. Before the shaft 66 starts to rotate the parts of the blowing mechanism are in the position shown in Fig. 11, the air passing from the low-pressure chamber 49 through the pipe 81 into the chamber 76 of the blower-valve through the opening 76 and the openings 89 in the valve-disk 86, which are opposite the opening 76, into the chamber 82, up through the pipe 90 into the interior of the tube 99, which incases the tube 106, and when the oscillating tube 106 is lowered, as just described, its upper end leaves the valve-disk 105, and thus low-pressure air is admitted into the tube 106 and passes down through it and the blowpipe into the glass in the molds, thereby expanding it. As the shaft 66 continues to rotate the valve-disk 86 is rotated until the openings 89 pass off from the openings 76 onto the high-pressure opening 75, and the high-pressure air from the high-pressure chamber 48 is substituted for the low-pressure air from the chamber 49, and the blowing is completed with this high-pressure air. The indicator-card for the operation appears, as heretofore described, in Fig. 37. When the shaft 66 completes its rotation and is stopped by the clutch 143 147 being withdrawn by the engagement of cam and cam-roller 154 and 153, as heretofore described, the cam 135 is returned to its original position, as shown in Fig. 16, and the roller 136 drops into the notch in the cam and the arm 125 is raised by the spring 128. The spring 128 draws the arm 125 upward, thereby drawing upward tube 106, bringing its upper end in contact with the valve-disk 105 and shutting off the passage of air, at the same time withdrawing the chuck 116 from the end of the blowpipe.

By the operation above described the glass on the end of the blowpipe has been blown in the form of article desired, which in the case of the machine from which the drawings were made consist of two lamp-chimneys placed end to end, as shown in Fig. 35. For commercial purposes these chimneys are separated after they are removed from the machine into single chimneys, as shown in Fig. 36. The remover, standing on the remover's platform at the rear of the machine, now steps upon the raised treadle, Fig. 27, of the remover's valve (which was raised when the feeder's valve was depressed at the beginning of the operation and has remained so) and depresses the valve to the position shown in Fig. 26, thereby permitting the air in the cylinder 271, which held the molds closed, to escape into the atmosphere through the pipe 239 and the exhaust-port 241 of the remover's valve. As soon as this is done the springs 266 instantly draw the molds apart to the position shown in Fig. 8. The remover now takes hold of the upper end of the blowpipe, draws it through the jaws 198 against the resistance of the latch 202, and lifts the blowpipe out of the socket 213 in the jaws 212 and hands the blowpipe, with the blown article attached to its lower end, to an assistant on the floor of the shop, who proceeds to remove the finished work from the blowpipe and give it the finishing operations preparatory to marketing it. As the molds open under the action of spring 266, the rollers 265 bear against plates 272, thereby forcing the pistons 273 into the cylinders 271, and as this is done the notch 292 in the latch 291 trips the finger in the manner above described, thereby swinging the arm 303 to the left, Fig. 28, and throwing the three-way valve 285 to the position in which the air in the cylinder 251 is exhausted into the atmosphere through the pipe 277 and the exhaust-port 287 of the three-way valve. As soon as this is done the piston 252, with the mold and other mechanism attached thereto, begins to descend in the cylinder 251, thereby immersing the molds in the water of the tank 44 and cooling them. As the piston 252 approaches the bottom of the cylinder 251 its motion is retarded in the manner above described, and just before it reaches the bottom the rod 306 strikes the horizontal arm 302 and reverses the three-way valve 285 in the manner heretofore described, thereby admitting air from the main compressor through the pipe 272 under the piston 252 and forcing the piston, and with it the molds and attached mechanism, upward. As the molds rise the rollers 265 travel up the track 268, and when they reach the curved portions 264 the molds (which have been only partly open during the immersion, as shown in Fig. 9) are opened to their fullest extent by the action of the springs 266, as shown in Fig. 8, and the machine is now ready to have the operation repeated.

As described early in the specification, the machine is divided horizontally into three units, which are entirely independent of each other and may be operated either simultaneously by a number of workmen or successively by a single workman on each platform. In practice it is most convenient to use only one workman on each platform. As soon as the feeder releases the feeder's valve after inserting the prepared glass in the machine he is at liberty to receive another blowpipe with another lot of glass from his assistants and insert this in the molds of the second section, depress the feeder's valve, and after releasing it proceed in the same way to the third section. By the time he has finished the third section the blowing will have been completed in the first section and the molds cooled and returned to their original position ready for him to repeat the operation with this section. The remover on the rear platform has of course been carrying on his operations in the order required to complete those of the feeder. As pointed out early in the specification, this machine has a distinct advantage over all of the automatic machines heretofore invented in that it is not automatic, and the machine does not operate until the feeder has the glass prepared in exactly the proper condition and has it in the molds exactly as he wants it before he closes the molds and starts the blowing operation. It is impossible in practice for a workman to prepare the glass ready for the molds with the automatic regularity required by the motions of an automatic machine, and if he does not have the glass exactly right at the time it is inserted in the molds the product will be imperfect in one or more ways. My machine will for this reason make more perfect articles, and is therefore better and more economical. It is of course understood that the form and materials of which my machine is constructed may vary within wide limits without departing from the spirit of the invention or avoiding the claims.

Having thus described my invention, what I claim, and desire to secure by Letters Patent, is—

1. In a glass-blowing machine, the combination of a tank to contain cooling liquid, a cylinder with its piston, glass-blowing molds so connected to said piston that as the piston is moved in said cylinder the molds are moved into and out of the cooling liquid in said tank, a blowpipe, means for holding said blowpipe in operative relation to said molds when out of said liquid, means for oscillating said blowpipe with reference to said mold, means for, at the start, supplying air from a low-pressure chamber to said blowpipe and, later in the blowing operation, substituting high-pressure air from a high-pressure chamber for said low-pressure air.

2. In a glass-blowing machine, the combination of a tank to contain cooling liquid, a cylinder with its piston, glass-blowing molds so connected to said piston that as the piston is moved in said cylinder the molds are moved into and out of the cooling liquid in said tank, a blowpipe, means for holding said blowpipe in operative relation to said molds when out of said liquid, means for, at the start, supplying air from a low-pressure chamber to said blowpipe, means for gradually blending said low-pressure air with air from a high-pressure chamber, and means for finally only admitting air from said high-pressure chamber to said blowpipe.

3. In a glass-blowing machine, the combination of a tank to contain cooling liquid, a cylinder with its piston and piston-rod, glass-blowing molds so connected to said piston that as the piston is moved in said cylinder said molds are moved into and out of said cooling liquid in said tank, and air-cylinders adjacent to said molds, adapted, when the air is admitted to said cylinders, to close said molds.

4. In a glass-blowing machine, the combination of a tank to contain cooling liquid, a cylinder with its piston, glass-blowing molds so connected to said piston that, as the piston is moved in said cylinder, the mold is moved into and out of the cooling liquid in said tank, means for supplying air-pressure to said cylinder under said piston, and automatic means attached to said piston whereby, as the piston reaches the bottom of its stroke, the air is admitted under said piston, substantially as described.

5. In a glass-blowing machine, the combination of a tank to contain cooling liquid, a cylinder with its piston, hinged glass-blowing molds so connected to said piston that as the piston is moved said molds are moved into and out of said cooling liquid in said tank, means for admitting air under said piston, a mold-closing cylinder having its piston adapted to swing one of said molds in one direction, mechanism adapted to force said mold and mold-closing piston in the opposite direction when the air is let out of said mold-closing cylinder, mechanism attached to said mold-closing piston adapted to let the air out from under the piston supporting the molds and automatic mechanism for admitting air under said piston when it reaches the bottom of its stroke.

6. In a glass-blowing machine, the combination of a tank to contain cooling liquid, a cylinder with its piston, hinged glass-blowing molds so connected to said piston that as the piston is moved said molds are moved into and out of said cooling liquid in said tank, means for admitting air under said piston, a mold-closing cylinder having its piston adapted to swing one of said molds in one direction, mechanism adapted to force said mold and mold-closing piston in the opposite direction when the air is let out of said mold-closing cylinder, mechanism attached to said mold-closing piston adapted to let the air out from under the piston supporting the molds and automatic mechanism for admitting air under said piston when it reaches the bottom of its stroke, arranged substantially as described for the purposes set forth.

7. In a glass-blowing machine, the combination of an air-conduit, sectional molds, a removable blowpipe, means for supporting the blowpipe in operative relation to the molds, means for supplying air to said blowpipe, means for oscillating said blowpipe, independent means under the control of one workman for closing the molds, and simultaneously admitting air to said blowpipe, automatic means for shutting off the air when the blowing is completed, and independent automatic means under the control of another workman for opening the molds.

8. In a glass-blowing machine, the combination of an air-conduit, sectional molds, a removable blowpipe, means for supporting the blowpipe in operative relation to the molds, means for supplying air to said blowpipe, means for oscillating said blowpipe, independent means under the control of one workman for closing the molds, and simultaneously admitting air to said blowpipe, automatic means for shutting off the air when the blowing is completed, and independent automatic means under the control of another workman for opening the molds and immersing them in cooling liquid.

9. In a glass-blowing machine, the combination of two chambers containing air at different pressures, an air-conduit leading to a blowpipe, automatic means for first admitting air from one of said chambers to said air-conduit and later substituting the air from the other chamber for the air from the first chamber.

10. In a glass-blowing machine, the combination of two chambers containing air at different pressures, an air-conduit leading to a blowpipe, automatic means for first admitting air from one of said chambers to said air-conduit, means for gradually blending the air from said chambers in said conduit and for finally only admitting air from the second of said chambers to said air-conduit.

11. In a glass-blowing machine, the combination of an air-chamber, an air-conduit leading to a removable blowpipe, a rotating valve between said chamber and said conduit, and an air-motor adapted to drive said valve having its exhaust-pipe discharging into said air-chamber.

12. In a glass-blowing machine, in combination with an air-conduit adapted to be connected with the upper end of a detachable blowpipe and molds adapted to shape the glass on the lower end of said blowpipe; stationary jaws adapted to hold the blowpipe in operative relation to said air-conduit and to said molds while the article is being blown and to allow the blowpipe to be inserted from the front of the machine before the blowing and to be withdrawn from the back of the machine after the blowing is completed.

13. In a glass-blowing machine, the combination of a pair of jaws, open throughout their length so that a blowpipe may slide through them from front to back, a bearing-surface on the face of each jaw adapted to receive an enlargement of said blowpipe, on which said blowpipe is oscillated while the blowing is taking place.

14. In a glass-blowing machine, the combination of a pair of jaws, open throughout their length so that a blowpipe may slide through them from front to back, a spring-latch extending across the opening between said jaws adapted to temporarily resist the passage of the blowpipe between the jaws and adapted to finally swing out of the way of said blowpipe so that it may pass through between the jaws, substantially as described.

15. In a glass-blowing machine, the combination of a high-pressure chamber, a low-pressure chamber, a regulating-valve on the high-pressure chamber discharging into the low-pressure chamber, another regulating-valve on the low-pressure chamber, an air-conduit leading to a blowpipe, a valve between said high and low pressure chambers and said conduit adapted to first admit air from the low-pressure chamber to said conduit and later substitute the air from the high-pressure chamber for the air from the low-pressure chamber in said conduit.

BAXTER MARTIN ASLAKSON.

Witnesses:
 D. LAVINE,
 S. DAVIS.